Patented Apr. 26, 1927.

1,626,261

UNITED STATES PATENT OFFICE.

PAUL G. WILLETTS, OF WEST HARTFORD, CONNECTICUT, ASSIGNOR TO HARTFORD-EMPIRE COMPANY, OF HARTFORD, CONNECTICUT, A CORPORATION OF DELAWARE.

METHOD OF MAKING REFRACTORY BLOCKS.

No Drawing.  Application filed October 13, 1926. Serial No. 141,428.

My invention relates to the manufacture, by ceramic methods, of refractory blocks such as flux blocks for glass furnaces. Its object is to provide an improved process of controlling the shape of such blocks so that they shall have opposite sides of equal dimensions, notwithstanding a tendency to unequal dimensional changes which results from the method by which the blocks are produced.

The present invention is appurtenant to a new system which I have developed for making refractory bodies by ceramic methods. In this system, clays and other selected ingredients are combined in the proper proportions to produce, by chemical arrangement when the bodies are fired in their final form, a dense, homogenous and finely-grained material, typically consisting of mullite and a small amount of vitreous slag. The temperatures which I employ for firing these bodies frequently exceed 3000° F. At these temperatures the transforming reaction takes place quickly and within a comparatively narrow range of temperature, and the material begins to lose its rigidity to a very slight extent.

These refractories are unusual, not only in their chemical and physical structure but also in the fact that they tend to shrink unequally during the firing operation. Thus when a rectangular block of considerable size, such as 9 x 9 x 4 inches, is fired at such high temperature upon an ordinary pallet after being made by the process outlined above, or by any other ceramic process in which the block begins to lose its rigidity during firing, the portion of the block adjacent to the pallet shrinks less than the portions which are further removed from the pallet during the firing operation. Therefore, a block that is preferably rectangular when placed in the kiln will be substantially smaller at its upper end than at its lower end when the firing is complete, the lower end of the block being locally enlarged or flared outwardly. Such irregular blocks are undesirable for building the walls of glass furnaces and for other uses where the blocks should be laid closely together.

The reduced shrinkage at the bottom of the block appears not to be merely the result of slumping through softening. It may be a result of the frictional resistance to shrinking offered by the support on which the block rests during firing, combined with some slight softening within the body of the block, or it may be due to difference in the absorption of heat by the top and bottom of the block, causing chemical conversion of the top and bottom to take place at different stages of shrinkage. My present invention aims to cause equal shrinkage at the top of such a block and at the bottom of the block on which it rests during firing.

According to my invention, I calculate the proportion in which the tops and bottoms of the blocks will shrink unequally if fired in the usual manner upon a rigid support. I then prepare the blocks with opposite faces that are unequal in this proportion, and with such corrective changes in the remaining faces as will cause these faces to shrink to the desired dimensions when the block is fired. Thus, for example, in making a block of my improved refractory material measuring 9 x 9 x 4 inches, I find that the upper end of such a block may shrink about 5% during firing, while the lower end may shrink only about 3.6%. Therefore, the block before firing is made with one face, 9.45 inches x 4.20 inches, or 5% oversize, while the opposite face is only 9.14 x 4.056 inches, or 3.6% oversize. The remaining sides of the block are made parallel for most of their area, with a modified contour near the smaller face mentioned above. Such modified contour is substantially the reverse of the contour of the local enlargement or flare which tends to form at the bottom of the block during firing. The exact corrective dimensions will of course vary in blocks made by different processes which exhibit varying dimensional differences in shrinkage during firing.

When such a block is fired, it is placed with the small end down, resting upon any usual pallet of refractory material. It is desirable that some sort of powdered or granular refractory substance be interposed between the block and the pallet to prevent sticking. Such powdered or granular material may be alundum, for example, or fired and crushed material similar to the material composing the blocks themselves. The block shrinks during the firing operation, this shrinking being greater at the top than at the bottom, and if the proportions of the original block have been properly selected, the top and bottom faces of the finished block will both be accurately 9 x 4 inches and the side faces will be parallel. In the case mentioned, the sides of the block that are vertical during firing may be made about 5% oversize and will shrink during firing to the desired height of 9 inches. The blocks should not be stacked upon one another for firing, as the additional load of the upper course or courses would tend to distort the blocks on which they rest.

I am aware that refractory blocks are customarily made oversize to allow for shrinkage during firing, but in all such cases known to me, such refractory bodies have not been subject to the unequal dimensional changes which tend to occur when the refractory material is brought to such temperature in the kiln that it begins to lose rigidity. Therefore, I consider that such unequal dimensional changes present a new problem, particularly since it has never been the practice heretofore to burn to maturity refractory blocks of substantial size.

I claim as my invention:

1. In the manufacture of refractory blocks which during firing, shrink unequally at top and bottom, the process of producing such a block having equal opposite faces that comprises making one of such faces smaller than the opposite face, and firing the block upon a substantially non-shrinking support with said smaller face down.

2. In the manufacture of refractory ceramic blocks that shrink unequally at top and bottom during firing, the process of producing such blocks with equal opposite faces that comprises making each block with opposite faces unequal in the proportion in which top and bottom of the block will shrink unequally, and firing the block upon a substantially non-shrinking support with said smaller face down.

3. In the manufacture of refractory blocks which, during firing, shrink unequally in different portions, the process of producing such a block having substantially parallel faces that comprises forming the block with modified dimensions at the part or parts of the block which require correction, such modified dimensions being so selected that the faces of the block, after firing, will be substantially parallel, and firing the block upon a substantially non-shrinking support.

4. In the manufacture of refractory blocks which, during firing, shrink unequally at top and bottom, with a local enlargement or flare at the bottom, the method of producing such a block having equal opposite faces that comprises making the block with corrective dimensions including a modified contour at the end of the block on which the block is to rest during firing, substantially the reverse of the locally enlarged contour which tends to form at the bottom of such a block, and firing the block upon a substantially non-shrinking support with the said modified end down.

Signed at Hartford, Conn., this 11th day of October, 1926.

PAUL G. WILLETTS.